United States Patent [19]
Jönsson et al.

[11] Patent Number: 5,762,801
[45] Date of Patent: Jun. 9, 1998

[54] PROCESS AND APPARATUS FOR BIOLOGICAL TREATMENT OF WATER

[75] Inventors: Kurt Jönsson; Lennart Lenvik, both of Nynäshamn; Magnus Hagrot, Saltsjö-Boo; Jonas Oskarsson, Nynäshamn, all of Sweden

[73] Assignee: Nordic Water Products AB, Nynäshamn, Sweden

[21] Appl. No.: 564,323

[22] PCT Filed: Jun. 8, 1994

[86] PCT No.: PCT/SE94/00555

§ 371 Date: May 1, 1996

§ 102(e) Date: May 1, 1996

[87] PCT Pub. No.: WO95/00447

PCT Pub. Date: Jan. 5, 1995

[30] Foreign Application Priority Data

Jun. 23, 1993 [SE] Sweden ................... 9302184

[51] Int. Cl.$^6$ ............... C02F 3/04; B01D 24/44; B01D 24/46
[52] U.S. Cl. ............... 210/618; 210/792; 210/796; 210/189; 210/270; 210/274
[58] Field of Search ................... 210/616, 617, 210/618, 792, 793, 794, 796, 150, 151, 189, 268, 269, 270, 274

[56] References Cited

U.S. PATENT DOCUMENTS

| | | | |
|---|---|---|---|
| 3,193,498 | 7/1965 | Platzer et al. | 210/189 |
| 3,679,581 | 7/1972 | Kunz | 210/189 |
| 3,731,810 | 5/1973 | Wallmuller | 210/189 |
| 4,231,863 | 11/1980 | Sutphin | 210/615 |
| 4,707,252 | 11/1987 | Durot et al. | 210/618 |
| 4,861,472 | 8/1989 | Weis | 210/189 |
| 5,277,829 | 1/1994 | Ward | 210/274 |
| 5,494,574 | 2/1996 | Unterman et al. | 210/618 |
| 5,520,804 | 5/1996 | Ward | 210/274 |

FOREIGN PATENT DOCUMENTS 667 080  9/1988  Sweden.

OTHER PUBLICATIONS

Patent Abstracts of Japan, vol. 10, No. 4 (C322), abstract of JP, A, 60-166093, Aug. 29, 1985.

TIBTECH, vol. 11, Apr. 1993, Mark C.M. Van Loosdrecht et al, "Biofilm bioreactors for wastewater treatment", pp. 117–121.

Primary Examiner—Neil McCarthy
Attorney, Agent, or Firm—Jacobson, Price, Holman & Stern, PLLC

[57] ABSTRACT

In the biological purification of sewage water or drinking water, it is known to purify the water in a filter bed of granular filter medium, wherein the filter medium is transported from the bottom of the bed to its upper side with the aid of air, so as to obtain a continuously working filter. It is suggested in accordance with the invention that the amount of filter medium to be transported is divided into two or more parts which are transported in parallel, so as to prevent the flow conditions in the transport tube having a negative effect on the reactivity of the filter bed by decreasing the bacteria strain.

8 Claims, No Drawings

PROCESS AND APPARATUS FOR BIOLOGICAL TREATMENT OF WATER

The present invention relates to a method and to an apparatus for purifying sewage water or drinking water biologically in a filter bed comprised of a granular filter medium, wherein the filter medium is transported by air from the bottom to the top of the filter bed, to obtain a continuously working filter.

When treating sewage water or drinking water biologically in a continuously working filter that includes a granular filter medium, there is used a bacteria strain which has been cultured particularly for the nature of the treatment concerned. These treatments typically involve nitrification and denitrification processes, which are concerned with removing nitrogen from the water. In order to utilize a filter bed optimally, it is necessary that the bed always contains a sufficiently large bacteria culture to effect the process concerned.

An example of a continuously working filter that includes a granular filter medium is found described and illustrated in Swedish Patent Specification 7602999-0 where the filter bed can consist of two or more modules. The suspension to be treated is taken in at the bottom of the filter bed and flows upwardly through the bed and exits from the upper surface of the bed as a finally treated liquid, at least for the moment. The granular filter medium, for instance sand, is transported from the bottom of the filter bed by means of an air-lift pump and is delivered to an apparatus for extracting suspended material and from there back to the upper side of the filter bed. The filter medium therewith passes slowly down through the filter bed and meets suspension under treatment.

It is this transportation in the air-lift pump from the bottom of the bed to the upper side thereof that can create a critical situation with regard to the bacteria strain. Under certain conditions, the bacteria strain can be so decimated during this transportation as to noticeably decrease the reactivity in the filter bed.

An object of the present invention is to achieve this transportation in the air-lift pump in a manner which will prevent the bacteria strain from being decimated to an extent which will appreciably affect the effectiveness of the water purification process. This object is achieved by using two or more transport tubes in parallel. As a result, the flow conditions in the transport tubes or pipes will not have a negative effect on the reactivity of the filter bed caused by excessive losses of the bacteria strain.

The invention and the problem fundamental to the invention will now be described in more detail.

An air-lift pump is used beneficially to transport vertically a suspension comprised of particles of varying sizes. The air used to operate the air-lift pump is introduced at an adapted overpressure into the transport tube of the pump immediately above the bottom orifice of the tube. The air rises up through the tube and entrains by suction medium located in the proximity of the bottom tube orifice. The air flow introduced into a transport tube of given diameter determines the amount of filter medium that can be transported per unit of time, although only to a certain limit for a given transport tube. The transport tube is unable to transport larger quantities of filter medium when this limit is reached. When wishing to increase the transport capacity, it is necessary to increase the diameter of the transport tube. With large tube diameters or large volumes of air per unit of time, the transportation conditions in the tube become violent, in other words greater turbulence is generated.

It is possible to see in an electron microscope the direct consequence of excessively strong turbulence in the tube transporting the bacteria strain. The convex surfaces of the filter particles, or granules, are completely free of bacteria. These bacteria are found in existing pores and to a greatly reduced extent in concavities or hollows. The observations made in the microscope can, in many instances, be verified by analyzing adosine triphosphate and measuring the oxygen consumption (grams COD per kilogram of bed material). Similarly, it can be shown with low flow rates and low turbulence in the transport tube that all surfaces are still covered substantially with bacteria. It can thus be established that turbulence is a decisive factor with respect to the size of the bacteria strain after transportation in the air-lift pump. When the flow in the transport tube is too slow or too gentle, it is possible that a thicker layer of bacteria will remain on the filter particles. This is also undesirable. Ideally, the bacteria will be worn away to an extent such that the filter particles will be just covered with bacteria but no more, with the exception of those bacteria that hide in existing pores.

The transportation conditions have been determined with the aid of a large number of assays in which turbulence in a transparent transport tube was observed in addition to analyzing the size of the bacteria mass and calculating the rate of flow in the transport tube. It was possible to establish as a result of these visual observations that ideal transportation of the filter particles is obtained when the air bubbles and the filter particles move at the same speed in the tube. In the majority of cases, this occurred when the tube diameter was smaller than 25 mm, preferably smaller than 20 mm, and when the total flow rate of all three media was less than 0.5 m/s, preferably about 0.3 m/s, or less. At larger tube diameters or at greater air volumes, the air bubbles were found to rise more quickly than the filter particles and the beginnings of increased turbulence was observed. On the basis of such observations and measurements of bacteria mass and flow rate, it is possible to establish flow-parameter limits which will ensure that a sufficiently large bacteria strain will be retained for an active and optimal biological process throughout the entire filter bed.

It is possible to establish the effectiveness of the process in the filter bed, referred to as reactivity, for each biological process. For instance, in the case of a denitrification process, the reactivity can be determined by analyzing nitrate nitrogen and nitrite nitrogen (by which is meant the nitrogen atom in the nitrate and nitrite) and is given by the measurement $gN/m^3 \cdot d$ (gram removed nitrogen per cubic meter of filter bed and calendar day). It is possible in each case to place the reactivity of a biological filter bed in relation to the flow conditions in the air-lift pump in one way or another.

These flow conditions may conveniently be given as the ratio between air flow and sand flow, for instance one liter of air/one liter of sand. A large ratio value will result in strong turbulence, therewith tearing a large number of bacteria from the particles. The aforesaid ratio will preferably be low, while, at the same time, desiring the highest possible sand flow. In a diagram in which this ratio is included as a function of the sand flow, liter sand/minute, said function thus being a measurement of the transport efficiency, there can be found a minimum in which the flow conditions are optimal.

The extent to which the filter medium shall be utilized, i.e. the time that the filter medium shall be active between transportations in the air-lift pump, is determined by experience with each type of process, each type of filter medium and each type of suspension to be treated. The simplest way to estimate this activity is to measure the rate at which the bed sinks. This enables the total volume of filter particles+ water+air to be determined, i.e. the volume that shall be transported per unit of time in an air-lift pump. According to the present invention, the quantity of material transported in the individual transport tubes will be limited to a value at which reactivity is not impaired appreciably by excessive wearing away of the bacteria strain, thus meaning that the transport volume is divided into several parallel part-volumes, by transporting the material through two or more transport tubes which work in parallel.

Dimensioning of the air-lift pump presents no problem in the case of very small filter beds. For instance, a small filter bed having an area of 0.15 $m^2$ and using in the air-lift pump one single transport tube having a diameter of 20 mm will result in acceptable reactivity for normal operation as a biological filter. However, the problem of impaired reactivity can occur when the filter area is only twice the aforesaid area, since this would require a transport tube of larger diameter. When the area of the filter beds is 1 $m^2$ or more, transportation in the air-lift pump becomes so violent as to drastically influence the reactivity.

The transport tubes can be put together in different ways, depending on their number. For instance, they can be bundled together or placed in rows adjacent one another. Each trans- port tube will preferably include its own air inlet pipe, therewith enabling the air supply to be controlled more accurately.

We claim:

1. A method for protecting a bacteria strain when purifying waste water or drinking water biologically in a filter bed of granular filter medium having surfaces with bacteria, said filter bed having a bottom side and an upper side, said method comprising continuously transporting said granular filter medium at a particular filter medium flow rate, with an air-lift pump from the bottom side of the filter bed to at least one separation means for suspended material, said air lift pump introducing air at a particular flow rate, and returning the filter medium thereafter to the upper side of the filter bed, wherein the amount of filter medium to be transported to said at least one separation means being divided into two or more parallel transport parts, the number of transport parts being such that the particular flow rates of the filter medium and the air respectively will not substantially differ from one another within said transport parts and said particular flow rates generate a turbulence that enables said surfaces to remain substantially covered with bacteria.

2. A method according to claim 1, the flow rate of the air and the filter medium within said transport parts being below 0.5 m/s.

3. Apparatus for protecting a bacteria strain according to claim 1 when purifying waste water or drinking water biologically in a filter bed of granular filter medium, said filter bed having bottom side and an upper side, said apparatus comprising transport means, which continuously transport the filter medium from the bottom side of the filter bed to least one separation means for suspended material with the aid of air, the filter medium thereafter being returned from the separation means to the upper side of the filter bed, wherein said at least one separation means being connected to two or more mutually adjacent transport tubes, which work in parallel.

4. Apparatus according to claim 3, comprising the transport tubes having a diameter smaller than 25 mm.

5. The method according to claim 1, the flow rate of the air and the filter medium within said transport parts being below 0.3 m/s.

6. The apparatus according to claim 3, comprising the transport tubes having a diameter smaller than 20 mm.

7. The method of claim 1 wherein there are two separation means and said two or more transport parts transport filter medium to one or each of said separation means.

8. The apparatus of claim 3 wherein there are two separation means and said two or more transport tubes are connected to one or each of said separation means.

* * * * *